(12) United States Patent
Büttner et al.

(10) Patent No.: US 11,194,968 B2
(45) Date of Patent: Dec. 7, 2021

(54) AUTOMATIZED TEXT ANALYSIS

(71) Applicant: Siemens Aktiengesellschaft, Munich (DE)

(72) Inventors: Florian Büttner, Munich (DE); Pankaj Gupta, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 27 days.

(21) Appl. No.: 15/993,641

(22) Filed: May 31, 2018

(65) Prior Publication Data

US 2019/0370331 A1 Dec. 5, 2019

(51) Int. Cl.
*G06F 40/30* (2020.01)
*G06N 3/08* (2006.01)
*G06N 3/04* (2006.01)

(52) U.S. Cl.
CPC ........... *G06F 40/30* (2020.01); *G06N 3/0445* (2013.01); *G06N 3/08* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2785; G06F 17/2795
USPC .................................................. 704/1, 9, 10
See application file for complete search history.

(56) References Cited

U.S. PATENT DOCUMENTS

| | | | | |
|---|---|---|---|---|
| 9,235,800 | B2 * | 1/2016 | Grothmann | G06N 3/084 |
| 9,552,548 | B1 * | 1/2017 | Brestoff | G06N 3/04 |
| 9,715,496 | B1 * | 7/2017 | Sapoznik | G10L 15/26 |
| 9,754,219 | B1 * | 9/2017 | Brestoff | G06N 3/0445 |
| 9,754,220 | B1 * | 9/2017 | Brestoff | G06F 40/40 |
| 9,754,220 | B1 * | 9/2017 | Brestoff | G06F 40/40 |
| 9,760,850 | B1 * | 9/2017 | Brestoff | G06Q 50/18 |
| 10,109,275 | B2 * | 10/2018 | Henry | G06F 40/289 |
| 10,169,315 | B1 * | 1/2019 | Heckel | G06F 40/166 |
| 10,210,244 | B1 * | 2/2019 | Branavan | G06N 5/041 |
| 10,216,715 | B2 * | 2/2019 | Broderick | G06F 40/253 |
| 10,387,888 | B2 * | 8/2019 | Sapoznik | H04L 67/306 |
| 2008/0281595 | A1 * | 11/2008 | Sakai | G10L 15/142 |
| | | | | 704/250 |
| 2011/0106743 | A1 * | 5/2011 | Duchon | G06F 16/35 |
| | | | | 706/46 |

(Continued)

OTHER PUBLICATIONS

Larocelle et al., A neural autoregressive topic model, 2012, Neural Information Processing Systems, pp. 1-9 (Year: 2012).*

(Continued)

*Primary Examiner* — Lamont M Spooner
(74) *Attorney, Agent, or Firm* — Schmeiser, Olsen & Watts LLP

(57) ABSTRACT

The present invention concerns a text analysis system, the text analysis system being adapted for utilizing a topic model to provide a document representation. The topic model is based on learning performed on a text corpus utilizing hidden layer representations associated to words of the text corpus, wherein each hidden layer representation pertains to a specific word of the text corpus and is based on a word environment including words occurring before and after the specific word in a text of the text corpus.

11 Claims, 1 Drawing Sheet

(56) References Cited

U.S. PATENT DOCUMENTS

| | | | | |
|---|---|---|---|---|
| 2015/0095017 | A1* | 4/2015 | Mnih | G06F 40/242 |
| | | | | 704/9 |
| 2016/0110343 | A1* | 4/2016 | Kumar Rangarajan Sridhar | |
| | | | | G06F 40/30 |
| | | | | 704/9 |
| 2017/0371861 | A1* | 12/2017 | Barborak | G06N 3/006 |
| 2018/0165554 | A1* | 6/2018 | Zhang | G06K 9/6256 |
| 2018/0300315 | A1* | 10/2018 | Leal | G06F 40/268 |
| 2018/0307749 | A1* | 10/2018 | Al Hasan | G06F 16/3329 |
| 2019/0130305 | A1* | 5/2019 | Sivertson | G06N 5/003 |
| 2019/0236139 | A1* | 8/2019 | DeFelice | G06F 40/56 |
| 2019/0294962 | A1* | 9/2019 | Vezer | G06N 7/005 |
| 2019/0303727 | A1* | 10/2019 | Foroughi | G06N 20/00 |
| 2019/0325068 | A1* | 10/2019 | Lai | G06N 3/08 |
| 2019/0370331 | A1* | 12/2019 | Buttner | G06N 3/08 |
| 2019/0370637 | A1* | 12/2019 | Dunning | G06F 17/18 |

OTHER PUBLICATIONS

Peters et al., Semi-supervised sequence tagging with biderictional language models, Apr. 29, 2017, arXiv:1705.00108v1, pp. 1-10 (Year: 2017).*

Peters et al., Deep contextualized word representations, Mar. 22, 2018, arXiv:1802.05365v2, pp. 1-15 (Year: 2018).*

Amiri et al., Learining text pair similarity with context-sensitive autoencoders, ACL, 2016, pp. 1-11 (pp. 1882-1892). (Year: 2016).*

Zheng et al., A deep and autoregressive approach for topic modeling of multimodal data, 2016, IEEE Transactions on Pattern Analysis and Machine Intelligence, vol. 38 p. 1056-1069. (Year: 2016).*

\* cited by examiner

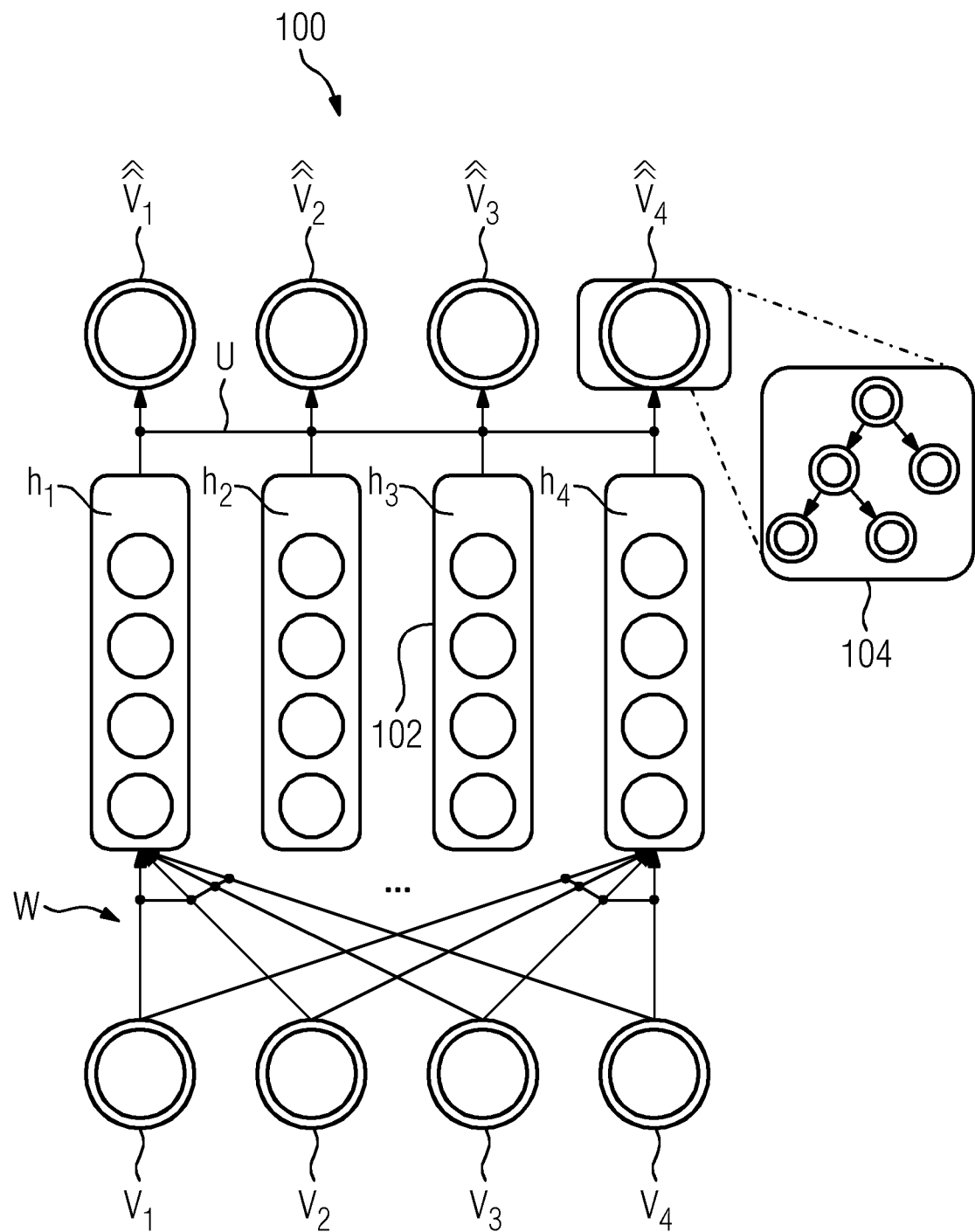

AUTOMATIZED TEXT ANALYSIS

FIELD OF TECHNOLOGY

The present invention concerns automatic text analysis, in particular in the context of Recurring Neural Networks (RNNs).

BACKGROUND

An important task in automatized text analysis is related to determine context of words, e.g. to determine topic of a text or document, in particular for classifying or retrieving information.

SUMMARY

An aspect relates to providing approaches improving text analysis, in particular with improved content determination.

There is disclosed a text analysis system, the text analysis system being adapted for utilizing a topic model to provide a document representation. The topic model is based on learning performed on a text corpus utilizing hidden layer representations associated to words of the text corpus. Each hidden layer representation pertains to a specific word of the text corpus and is based on a word environment comprising words occurring before and after the specific word in a text of the text corpus.

There is also disclosed a method for performing text analysis. The method comprises utilizing a topic model to provide a document representation, the topic model being based on learning performed on a text corpus utilizing hidden layer representations associated to words of the text corpus, wherein each hidden layer representation pertains to a specific word of the text corpus and is based on a word environment comprising words occurring before and after the specific word in a text of the text corpus.

The invention is particularly suitable for document representation for context determination and/or information retrieval, as the consideration of the encompassing word environment facilitates more successful context identification.

The topic model may be a neural autoregressive topic model.

Such models are particularly suitable for context determination and/or for considering the word environment. An exemplary topic model may be based on DOCNADE (Document Autoregressive Neural Distribution Estimator) or be similar thereto.

In some cases, the document representation may represent and/or comprise a word distribution and/or a word probability distribution. Alternatively, or additionally, the representation may represent and/or comprise a measure of generalization like perplexity, and/or interpretability like topic coherence, and/or applicability, e.g. pertaining to document retrieval. The document representation may be determined based on hidden layer representations, e.g. hidden-state variables for each word of interest.

The system may be adapted to determine, and/or the method may comprise determining, a topic and/or document representation of an input text based on the document representation. The input text may be part of the text corpus, or separate or independent thereof. Such determining may be based on learning performed with the topic model, e.g. to determine a space mapping word distributions and/or texts to topics. Alternatively, or additionally, it may be considered that method and/or system are utilised for Natural Language Processing (NLP). The document representation of the input text may be dependent on document representation determined based on the text corpus.

A Recurring Neural Network (RNN) may be used for learning hidden layer representations. The RNN may be used to learn the topic model.

There is also considered a computer program comprising instructions causing a computer system to perform and/or control a method as described herein.

Also, a storage medium storing a computer program as described herein is considered.

In general, determining a document representation may comprise determining document representations for all texts of a text corpus. Determining a document representation of an input document may be based on the representations for all texts, and/or on learning performed thereon.

The method may especially be carried out, completely or in part, by a computer system. To these ends, the method may be formulated as a computer program product with program code means. The above described system may comprise the computer system. Advantages or features of the method may apply to the method and vice versa.

BRIEF DESCRIPTION

The above-described properties, features and advantages of present invention as well as the way they are achieved will be made clearer and better understandable in the light of the following discussion, making reference to exemplary embodiments shown in accompanying FIGURES, in which FIG. 1 shows an exemplary schematic of a text analysis system according to the invention.

DETAILED DESCRIPTION

An exemplary text analysis system 100 is shown schematically in FIG. 1. A text corpus may generally comprise a plurality of documents or texts, each of which may comprise a different number of words. The topic model may learn based on each text of the text corpus. For an example text or document v with I words $vi=v_1 \ldots v_I$, a hidden layer representation or hidden-state vector hi may be determined for one or more, in particular each, word $v_i$, based on a word environment comprising both words $v_n$ (n<i) and $v_m$ (m>i), in particular all words fulfilling such condition. The first word, i=1, and last word, i=I, will have one-sided word environments. The word environment may be ordered according to the arrangement of words in the text. Utilizing the proposed word environment allows using the full context of a word $v_i$, improving context determination.

In FIG. 1, example words $v_1 \ldots v_4$ of an exemplary document v may be input into the text analysis system with the topic model. Bold lines identify connections sharing parameters, e.g. W. Observations, indicated with a double circle, for each word vi are multinominal. $\hat{v}_1, \hat{v}_2, \hat{v}_3, \hat{v}_4$ represent autoregressive conditionals p. Connections between each $v_i$ and hidden units for determining hidden layer presentations are shared, and each conditional is decomposed in a tree of binary logic regressions 104.

Representations hi may be determined in a language modeling and feed-forward fashion, e.g. computing informed representations, which may be considered latent document representations 102. A scaling factor D may be considered to account for documents of different lengths. A sequence of hidden layer representations may be determined using the text analysis system, in particular the topic model and/or associated RNN.

Exemplary computations may be according to a variant incorporation both $v_n$ (n<i) and $v_m$ (m>i) contexts in computing h, e.g. according to:

$$h_i(v_n, v_m) = g(Dc + \Sigma_{k<i} W_{:,v_k} + \Sigma_{k>i} W_{:,v_k}),\quad \text{(Eq. 1)}$$

wherein the autoregressive conditional may be expressed as:

$$p(v_i = w | v_n, v_m) = \frac{\exp(b_w + U_{w,:} h_i(v_n, v_m))}{\sum_{w'} \exp(b_{w'} + U_{w',:} h_i(v_n, v_m))}. \quad \text{Eq(2)}$$

Alternative computations may account for vi in addition to vn and vm, e.g. according to:

$$h_i(v) = g(Dc + \Sigma_{k<i} W_{:,v_k} + \Sigma_{k>i} W_{:,v_k} + W_{:,v_i}). \quad \text{Eq(3)}$$

The autoregressive conditional may be expressed as:

$$p(v_i = w | v) = \frac{\exp(b_w + U_{w,:} h_i(v))}{\sum_{w'} \exp(b_{w'} + U_{w',:} h_i(v))}. \quad \text{Eq(4)}$$

Above, i may be in [1, . . . , D], $h_i(v)$ refers to $h_i(v_n, v_m, vi)$ and $p(v_i=w|v)$ refers to $p(v_i=w|v_n, v_m, v_i)$.

The autoregressive conditionals may be computed by a neural network for each word vi to learn a representation hi efficiently, e.g. based on a linear transformation followed by a non-linear transformation. The weight W may be the same across all conditionals and tied or related contextual observable, which are indicated as bold lines in FIG. 1.

A binary word tree 104 may be used to decompose the computation of the D conditionals, allowing a time logarithmic dependence of K. Variants with or without D may be considered. Parameters b, c, W, U may be learned by minimizing the average log-likelihood across all documents v with stochastic gradient.

For each conditional p, an own hidden layer $h_i(v_n, v_m)$ or $h_i(v_n, v_m, v_i)$ may be computed. H may be the size of each hidden layer h, D the size of the document v, or part of the document to be considered.

The test analysis system 100 may undergo training on a text corpus comprising a plurality of documents or text v. After training, a document representation for a new document v' may be determined, e.g. a topic thereof. For example, a hidden layer representation for the words $v_i'$ in the new document v' may be determined based on the learning performed by the text analysis system, considering for example for each observation i' in [1 . . . D'] for words of v'. The representation may be the last hidden layer representation $h_{D'}$ extracted from the text analysis system.

Any module or functionality or action described herein may be implemented in software, e.g. as a program module or separate program interacting with another program. A system may generally comprise processing circuitry and/or one or more interfaces and/or memory. It may be considered that a system is implemented as or on a computer, and/or a dedicated analysis device. Processing circuitry may comprise integrated circuitry, e.g. one or more processors and/or controllers, e.g. microcontrollers, and/or one or more FPGAs (Field-Programmable Gate Array) and/or ASICs (Application-Specific Integrated Circuitry). The processing circuitry may comprise, and/or be connected or connectable to one or more memories and/or storage media, e.g. for reading and/or writing and/or accessing data. Processing circuitry may be located on one device, or be distributed. A memory or storage medium may be magnetic and/or optical and/or electrical and/or volatile and/or non-volatile. Examples of memories or storage media comprise flash memory, read-only memory, random access memory, CD/DVD/BlueRay, cache memory, buffer memory, etc.

Even though present invention has been illustrated and explained in detail above with reference to the preferred embodiments, the invention is not to be construed as limited to the given examples. Variants or alternate combinations of features given in different embodiments may be derived by a subject matter expert without exceeding the scope of present invention.

The invention claimed is:

1. A text analysis system, comprising:
   a processor;
   a memory device coupled to the processor; and
   a computer readable storage device coupled to the processor, wherein the storage device contains program code executable by the processor via the memory device to implement a method comprising:
   utilizing a topic model to provide a document representation, the topic model being based on learning performed on a text corpus utilizing hidden layer representations associated to words of the text corpus, wherein each hidden layer representation pertains to a specific word of the text corpus and is based on a word environment comprising words occurring before and after the specific word in a text of the text corpus, for determining a context of the specific word;
   wherein the hidden layer representation is calculated according to a formula, wherein the formula is represented by:

$$h_i(v_n, v_m) = g(Dc + \Sigma_{k<i} W_{:,v_k} + \Sigma_{k>i} W_{:,v_k});$$

wherein the hidden layer representation is a single unified context vector that simultaneously accumulates the context and the uses the context to learn text representation in a single step;
   wherein the topic model is a neural autoregressive topic model and an autoregressive conditional is expressed as:

$$p(v_i = w | v_n, v_m) = \frac{\exp(b_w + U_{w,:} h_i(v_n, v_m))}{\sum_{w'} \exp(b_{w'} + U_{w',:} h_i(v_n, v_m))}.$$

2. The text analysis system according to claim 1, wherein the document representation represents a word probability distribution.

3. The text analysis system according to claim 1, the system being adapted to determine a topic of an input text based on the document representation.

4. The text analysis system according to claim 1, wherein the system utilises a Recurring Neural Network, RNN, for learning hidden layer representations.

5. A method for performing text analysis, the method comprising utilizing a topic model to provide a document representation, the topic model being based on learning performed on a text corpus utilizing hidden layer representations associated to words of the text corpus, wherein each hidden layer representation pertains to a specific word of the text corpus and is based on a word environment comprising words occurring before and after the specific word in a text of the text corpus, for determining a context of the specific word;

wherein the hidden layer representation is calculated according to a formula, wherein the formula is represented by:

$$h_i(v_n, v_m) = g(Dc + \Sigma_{k<i} W_{:,v_k} + \Sigma_{k>i} W_{:,v_k});$$

wherein the hidden layer representation is a single unified context vector that simultaneously accumulates the context and the uses the context to learn text representation in a single step;

wherein the topic model is a neural autoregressive topic model and an autoregressive conditional is expressed as:

$$p(v_i = w \mid v_n, v_m) = \frac{\exp(b_w + U_{w,:} h_i(v_n, v_m))}{\sum_{w'} \exp(b_{w'} + U_{w',:} h_i(v_n, v_m))}.$$

6. The method according to claim 5, wherein the document representation represents a word probability distribution.

7. The method according to claim 5, the method comprising determining a topic of an input text based on the document representation.

8. The method according to claim 5, the method comprising utilizing a Recurring Neural Network, RNN, for learning hidden layer representations.

9. A non-transitory computer program comprising instructions causing a computer system to perform and/or control a method according to claim 5.

10. A non-transitory storage medium storing a computer program according to claim 9.

11. A text analysis system, comprising:
a processor;
a memory device coupled to the processor; and
a computer readable storage device coupled to the processor, wherein the storage device contains program code executable by the processor via the memory device to implement a method comprising:
utilizing a topic model to provide a document representation, the topic model being based on learning performed on a text corpus utilizing hidden layer representations associated to words of the text corpus, wherein each hidden layer representation pertains to a specific word of the text corpus and is based on a word environment comprising words occurring before and after the specific word in a text of the text corpus, for determining a context of the specific word;
wherein the hidden layer representation is calculated according to a formula, wherein the formula is represented by:

$$h_i(v) = g(Dc + \Sigma_{k<i} W_{:,v_k} + \Sigma_{k>i} W_{:,v_k} + W_{:,v_i})$$

wherein the hidden layer representation is a single unified context vector that simultaneously accumulates the context and the uses the context to learn text representation in a single step;

wherein the topic model is a neural autoregressive topic model and an autoregressive conditional is expressed as:

$$p(v_i = w \mid v) = \frac{\exp(b_w + U_{w,:} h_i(v))}{\sum_{w'} \exp(b_{w'} + U_{w',:} h_i(v))}.$$

* * * * *